United States Patent
Yoshida et al.

(10) Patent No.: US 7,767,092 B2
(45) Date of Patent: Aug. 3, 2010

(54) DECOLORIZATION METHOD OF COLORED EFFLUENT

(75) Inventors: Eiichi Yoshida, Tokyo (JP); Masahiko Nakamura, Tokyo (JP); Kaori Soeda, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 348 days.

(21) Appl. No.: 11/867,170

(22) Filed: Oct. 4, 2007

(65) Prior Publication Data

US 2008/0110835 A1    May 15, 2008

(30) Foreign Application Priority Data

Nov. 14, 2006    (JP) .............................. 2006-307731

(51) Int. Cl.
  *C02F 1/52*    (2006.01)
(52) U.S. Cl. ........................ 210/709; 210/724; 210/917
(58) Field of Classification Search ................... 210/917
  See application file for complete search history.

(56) References Cited

U.S. PATENT DOCUMENTS

| | | | | |
|---|---|---|---|---|
| 3,652,407 A | * | 3/1972 | Paleos ........................ | 210/668 |
| 4,089,780 A | * | 5/1978 | Svarz et al. .................. | 210/725 |
| 4,425,238 A | * | 1/1984 | Degen et al. ................ | 210/666 |
| 4,724,045 A | * | 2/1988 | Ackel .......................... | 162/29 |
| 5,360,551 A | * | 11/1994 | Weber ......................... | 210/719 |
| 5,395,536 A | * | 3/1995 | Brown et al. ................ | 210/727 |
| 5,611,934 A | * | 3/1997 | Shepperd et al. ............ | 210/719 |
| 6,589,427 B2 | * | 7/2003 | Moghe et al. ............... | 210/667 |
| 7,468,137 B2 | * | 12/2008 | Kojima et al. ............... | 210/705 |

\* cited by examiner

*Primary Examiner*—Peter A Hruskoci
(74) *Attorney, Agent, or Firm*—Lucas & Mercanti, LLP

(57) ABSTRACT

A method of decolorizing a colored effluent comprising (i) a colored substance; and (ii) a polyvalent carboxylic acid or a polyvalent aminocarboxylic acid, the method including the steps of: (a) controlling a hydrogen ion exponent (pH) of the colored effluent to be in a range in which two or more carboxylic acid groups in the polyvalent carboxylic acid or the polyvalent aminocarboxylic acid does not dissociate; (b) adding an inorganic metal salt to the colored effluent so as to allow the inorganic metal salt to react with the colored substance to form a precipitation in the colored effluent, and (c) eliminating the precipitation from the colored effluent.

8 Claims, No Drawings

DECOLORIZATION METHOD OF COLORED EFFLUENT

This application is based on Japanese Patent Application No. 2006-307731 filed on Nov. 14, 2006 with Japan Patent Office, the entire content of which is hereby incorporated by reference.

TECHNICAL FIELD

The present invention relates to a decolorization method of colored effluent generated in production processes, and in particular to a decolorization method in which inorganic metal salts undergo reaction under regulation of the hydrogen ion exponent (pH).

BACKGROUND

Water, employed in production processes such as a toner production process, a paper bleaching process, or a textile material dying process, is often colored. Even though COD and BOD, representing environment load, of such colored aqueous effluent are each regulated to be the value under the predetermined standards, it is sensuously difficult to eliminate the feeling of contamination due to the presence of color. Further, it is assumed that the re-use of colored effluent in production processes is rarely carried out due to concerns of any of the adverse effects to products.

The present situation is such as above, but heretofore, trials to decolorize effluent via separation of colored components have been undertaken. Specifically there is a method in which coagulants such as inorganic or polymer coagulants are added to an effluent to catch colored materials. However, colored materials such as dyes commonly exhibit high hydrophilicity, and in order to eliminate high hydrophilic materials in aqueous effluents, it has been necessary to employ a large amount of the above coagulants. Consequently, techniques to separate colored materials by decreasing the used amount of coagulants have been investigated. Specifically, a technique is disclosed in which inorganic coagulants and polymer coagulants are added to a colored effluent to eliminate colored materials (refer, for example, to Patent Document 1).

Further, a method has appeared in which by paying attention to the polarity of both polymer coagulants and colored materials, polymer coagulants having a group exhibiting a reverse polarity to that of colored materials are added, or amphoteric polymer coagulants are employed (refer, for example, to Patent Document 2).

Meanwhile, cases occur in which chelating agents (for example, polyvalent carboxylic acids or polyvalent aminocarboxylic acids) are incorporated in the effluent together with the colored materials. Chelating agents are added to used water during the production process so that product quality and productivity are enhanced. As a result, the chelating agents remain in the effluent. When inorganic coagulants are added to a colored effluent incorporating the chelating agents, colored material components once captured by inorganic coagulants (inorganic metal salts) are often re-dissolved due to effects of chelating agents, whereby it has been difficult to decolorize the colored effluent.

(Patent Document 1) Japanese Patent Publication Open to Public Inspection (hereinafter referred to as JP-A) No. 2004-154734

(Patent Document 2) JP-A No. 2004-344829

SUMMARY

Removal of colored materials via the above technology is realized by the formation of separation coagulants via combination and coagulation of colored materials with polymer coagulants. However, for example, it has been very difficult to produce nearly colorless water. In order to efficiently remove colored materials, trials have been undertaken in which a relatively large amount of chemicals such as polymer coagulants and inorganic metal salts are added. Formation of separation coagulants of colored materials did not occur as expected, whereby it has been not possible to obtain slightly colored or nearly colorless water. Further, an increase in the added amount of polymer coagulants and inorganic metal salts to a colored effluent increases contamination in the effluent and further increases the amount of separation coagulants which become waste after processing, whereby it has been difficult to mention that the above is a preferable response to the environment.

An object of the present invention is to provide a colored effluent decolorizing method which enables preparation of nearly colorless water without an increase in contamination of the effluent and wastes by the use of a large amount of inorganic metal salts during decolorization of colored effluents.

The present invention is achieved employing the following embodiments.

A method of decolorizing a colored effluent comprising (i) a colored substance; and (ii) a polyvalent carboxylic acid or a polyvalent aminocarboxylic acid, the method comprising the steps of:

(a) controlling a hydrogen ion exponent (pH) of the colored effluent to be in a range in which two or more carboxylic acid groups in the polyvalent carboxylic acid or the polyvalent aminocarboxylic acid does not dissociate;

(b) adding an inorganic metal salt to the colored effluent so as to allow the inorganic metal salt to react with the colored substance to form a precipitation in the colored effluent, and (c) eliminating the precipitation from the colored effluent.

The colored effluent decolorizing method of the present invention results in excellent effects, in which it is possible to separate colored materials employing, at low cost via a simple method, from colored effluent incorporating at least a colored material, and any polyvalent carboxylic acids or polyvalent aminocarboxylic acids, without the use of an excessive amount of inorganic metal salts.

DESCRIPTION OF THE PRESENT INVENTION

The inventors of the present invention explored a method to separate colored materials from a colored effluent incorporating colored materials, as well as polyvalent carboxylic acids and polyvalent aminocarboxylic acids, employing a low cost and simple method without using an excessive amount of inorganic metal salts.

As a result of various investigations, it was discovered that it was possible to preferably separate colored materials when inorganic metal salts are allowed to act on a colored effluent, incorporating colored materials as well as polyvalent carboxylic acids and polyvalent aminocarboxylic acids, in which the hydrogen ion exponent (pH) was regulated so that at least two carboxyl groups in compounds including polyvalent carboxylic acids and polyvalent aminocarboxylic acids result in no dissociation.

The present invention will now be detailed.

The colored effluent decolorizing method of the present invention is one in which inorganic metal salts are allowed to act on a colored effluent, incorporating colored materials as well as polyvalent carboxylic acids and polyvalent aminocarboxylic acids, so that the hydrogen ion exponent (pH) is regulated to result in no dissociation, whereby coagulants which are not easily re-dissolved in water are formed and colored materials are removed by separated the resulting coagulants from water to realize decolorization.

Colored effluents, as described herein, refer to the colored effluents incorporating colored materials described below, as well as polyvalent carboxylic acids and polyaminocarboxylic acids among effluents which are formed via production activities employing water, and namely refers to colored water. They include not only transparent colored effluents but also effluents exhibiting a certain degree of turbidity such as a milky liquid. Methods to confirm the colored state of effluents are not particularly limited, and include visual confirmation and methods employing measurement instruments such as spectrophotometers.

An example of the visual confirmation method of coloration includes the method in which an effluent is placed in a vessel such as a beaker and the resulting vessel is allowed to stand on white paper, whereby any colored state is qualitatively determined.

Further listed is a quantitative determination method, which determines the concentration (called the degree of coloration) of colored materials dissolved in the effluent. Namely, according to the relationship of the Lambert-Beer Law, the concentration of the colored materials in liquid is primarily calculated based on the absorbance determined via a spectrophotometer.

It is possible to determine the degree of coloration via a spectrophotometer such as an ultraviolet visible spectrophotometer "V-530" (produced by JASCO Corp.) based on the following procedures:

(1) Absorbance in the visible range (400-700 nm) is determined via a spectrophotometer.

(2) An integral of the absorbance in the range of 400-700 nm is calculated based on the following calculation formula. Meanwhile, the degree of coloration is calculated employing the mode of "peak area" of the spectrophotometer.

$$\text{Degree of coloration} = \int_{400}^{700} f(\lambda) d\lambda$$

wherein $f(\lambda)$ represents absorbance at each wavelength, and $\lambda$ represents wavelength.

Further, during determination of absorbance employing the above ultraviolet visible spectrophotometer "V-530" (produced by JASCO Corp.), conditions are as follows.

Measurement cell: rectangular quartz cell (produced by Starna Inc.)
   standard rectangular cell Type 1 1/Q/10 (length 12.5 mm×width 12.5 mm×height 45 mm)
   (capacity 3.5 ml)
Sample amount: 3.0 ml
Blank: Pure water was employed.

Absorbance was determined at an interval of 1 nm in the visible range (400-700 nm). The value of absorbance $f(\lambda)$ was obtained by subtracting "absorbance of pure water" from "absorbance of the sample at each wavelength".

The colored effluents employed in the present invention include those which incorporate at least colored materials and further in addition to those which only incorporate colored materials in the effluent, include those which incorporate various chemicals such as chelating agents which are added and employed during production processes.

Further, colored materials, as described in the present invention, refer to those, which enable coloration of water via dissolution or dispersion in water. Namely, other than those which are dissolved in water, included are those such as an emulsion in which particles are subjected to colloidal dispersion in water. Still further, with regard to those which are soluble in water, other than those which are completely soluble, included are colored materials, some of which is dissolved in water and the rest of which is not dissolved to result in a precipitate state.

The decolorization method of colored effluents of the present invention includes a process which forms coagulants of colored materials in such a manner that while stirring a colored effluent in a coagulation tank at normal temperature (for example, 10-35° C.), inorganic metal salts are allowed to react in a state in which the pH is controlled so that so that the hydrogen ion exponent (pH) is regulated to result in no dissociation of at least two carboxyl groups of polyvalent carboxylic acids and polyvalent amino acids, as well as a process which removes the resulting coagulants.

Meanwhile, regulation of the hydrogen ion exponent (pH) to results in no dissociation of at least two carboxyl groups of polyvalent carboxylic acids and polyvalent amino acids may be carried out prior to or after the addition of inorganic metal salts to the colored effluent.

The used amount of inorganic metals is preferably 100-2,000 ppm in terms of solids. It is more preferably 150-1,500 ppm, and it is still more preferably 300-1,500 ppm. The hydrogen ion exponent (pH) is regulated and inorganic metal salts are allowed to react. After allowed to stand over about 10 minutes, coagulation of colored materials is carried out, whereby it is possible to decolorize the colored effluent to reach a degree of coloration of at most 10.

Commonly, via the addition of the above amount, it is possible to realize decolorization to a degree of coloration of at most 10. However, when the concentration of colored materials in the colored effluent is relatively high, the addition amount may need to be more than the above.

Hydrogen ion exponents (pHs), at which at least two carboxyl groups in polyvalent carboxylic acids and polyvalent amino acids result in no dissociation, are shown in references as logarithmic value pKa of the inverse number of each dissociation index. Of these, the value which is less than the second pKa in an order of magnitude of the pKa value is the pH at which at least two carboxylic acids result in no dissociation.

When one or all carboxylic acids, which result in no dissociation, do result in dissociation, polyvalent carboxylic acids and polyvalent aminocarboxylic acids readily form complexes with metal ions of inorganic metal salts. As a result, the coagulating action exhibited by metal ions is retarded to degrade coagulation separation capability of colored materials.

In practice, the hydrogen ion exponent (pH), at which at least two carboxyl groups result in no dissociation, differs depending on compounds, while the pH of trisodium citrate is 4.3 and the pH of sodium 1,2-diaminopropanetetraacetate is 2.0.

Compounds to regulate the hydrogen ion exponent (pH) are not particularly limited, and specific examples include hydrochloric acid, sulfuric acid, and sodium hydroxide.

Polyvalent carboxylic acids, as described in the present invention, are compounds having at least two carboxyl groups in one molecule or in the salts thereof. Specific examples include oxalic acid, malonic acid, succinic acid, glutaric acid, adipic acid, pimelic acid, azelaic acid, sebacic acid, maleic acid, fumaric acid, itaconic acid, citraconic acid, mesaconic acid, gluconic acid, muconic acid, lactic acid, hydroacrylic acid, salicylic acid, vanillic acid, mandelic acid, malic acid, glyceric acid, tartaric acid, citric acid, isocitric acid, trimellitic acid, trimesic acid, aconitic acid, tricarballylic acid, ethanetricarboxylic acid, and hexatricarboxylic acid, while salts include sodium and potassium salts. Polyvalent aminocarboxylic acids are compounds having at least two carboxyl groups in one molecule or in the salts thereof.

Desirable as the inorganic metal salts employed in the present invention are those which form at least bivalent ions in water. Specifically cited are aluminum sulfate (sulfuric acid alum), polychlorinated aluminum (PAC), aluminum chloride, ferric chloride (iron(III) chloride), ferric polysulfate, and ferrous chloride.

The decolorization method of colored effluents will now be further described.

In the present invention, the decolorization method is as follows. Initially, the hydrogen ion exponent (pH) of a colored effluent incorporating at least a colored material, and a polyvalent carboxylic acid or a polyvalent aminocarboxylic acid is regulated to the value at which at least two carboxyl groups of the polyvalent carboxylic acids or polyvalent amino acids result in no dissociation. Thereafter, inorganic metal salts are added and the above colored materials are removed from the colored effluent.

When the colored materials are removed from the colored effluent, it is not necessary to carry out the removal while particularly controlling its temperature, and it is commonly possible to carry out the removal at normal temperature (for example, 10-35° C.).

The added amount of inorganic metal salts into a colored effluent, though depending on the content of colored materials, is commonly 100-2,000 ppm in terms of solids, but is preferably 150-1,500 ppm.

In a state in which the hydrogen ion exponent (pH) is regulated, inorganic metal salts are added to a colored effluent to realize the above range and coagulation is sufficiently carried out, whereby the degree of coloration of the colored effluent, determined by a spectrophotometer, reaches the level of at most 10. This is also confirmed via the description of examples described below.

Almost no coloration of water at the level of a degree of coloration of at most 10 is visually noticed and the water is at the sufficient level for re-use.

Colored materials incorporated in the colored effluent, which enable realization of the effects of the present invention, will now be described. Colored materials, as described in the present invention, refer to materials which are dissolved in or dispersed into water to color water. Namely, other than those which are dissolved in water, included are those which exhibit a state in which particles are subjected to colloidal dispersion, such as an emulsion, in water. Further, with regard to those which are soluble in water, other than colored materials which are completely dissolved in water, included are those in which some parts are dissolved in water and the other parts are not dissolved to result in a precipitation state.

Specifically, representative materials, which are readily dissolved in water to result in coloration, include dyes. Further cited as those, which result in coloration in such a manner that particles are dispersed into water, are pigments, charge controlling agents employed in electrophotographic developers, latex forming resin particles, and toner particles. The content of colored materials is not particularly limited, but in many cases, the content is commonly 1-5,000 ppm. Further, the content of particles is often 1-20 parts by weight with respect to 100 parts by weight of the effluent.

Colored effluents incorporating chelate compounds, such as polyvalent carboxylic acids and polyvalent aminocarboxylic acids, also exist. As noted above, in conventional technology, it has been very difficult to remove colored materials from colored effluents incorporating chelate compounds.

Namely cited as one of the colored material removing technologies, is a method in which inorganic metal compounds are added, whereby colored materials are coagulated by combining metal ions with colored materials. When chelating agents exist in an effluent, complexes are formed between metal ions and the chelating agents. As a result, the colored materials are re-dissolved in water from coagulants which have been once formed, whereby it has been not possible to sufficiently remove the colored materials. Consequently, during decolorization of colored effluent incorporating chelating agents, it has been essential to add inorganic metal compounds in a relatively large amount when the concentration of hydrogen ions is not regulated.

In the present invention, the addition of an inorganic metal salt to the colored effluent can be done after or before regulating the hydrogen ion exponent (pH). In either case, it possible to remove colored materials from colored effluent by the addition of inorganic metal salts of a relatively small amount due to the control of pH of the colored effluent. The addition of an inorganic metal salt to the colored effluent is preferably done after regulating the hydrogen ion exponent (pH). As a result of this procedure, it is possible to remove colored materials from colored effluent incorporating chelating agents.

As noted above, in the present invention, during the process of separating colored materials from the colored effluent incorporating at least a colored material and a chelate compound such as a polyvalent carboxylic acid or a polyvalent aminocarboxylic acid, initially, the hydrogen ion exponent (pH) is regulated to the value at which at least two carboxyl groups of polyvalent carboxylic acids or polyvalent aminocarboxylic acids result in no dissociation, and thereafter, inorganic metal salts are added.

It is assumed that by regulating the hydrogen ion exponent (pH) to the value at which at least two carboxyl groups of polyvalent carboxylic acids or polyvalent aminocarboxylic acids result in no dissociation, followed by the addition of inorganic metal salts, the following two actions are realized, whereby colored materials are not re-dissolved from the coagulants. Namely, (1) the surface of the coagulants is electrically neutralized to result in a non-polar state, whereby the colored materials are not re-dissolved in water from the coagulants. (2) Coagulants of the colored materials result in a firm structure, whereby the colored materials are not re-dissolved in water from the coagulants.

As described above, in the present invention, it is assumed that the formed coagulants result in a structure which tends to not re-dissolve colored materials in water, whereby without using inorganic salts in an excessive amount, it is possible to prepare more colorless water, compared to water prepared by conventional technologies.

EXAMPLES

The present invention will now be described with reference to examples; however, the present invention is not limited thereto.

1. Preparation of Colored Effluent

The following colored effluent was prepared as one to be subjected to decolorization treatment.

(Colored Effluent 1)

A colored effluent, which was prepared so that the content of cyan pigment "C.I. Acid Blue 120" was 40 ppm and the content of trisodium citrate was 500 ppm, was designated as "Colored Effluent 1". The degree of coloration, determined by the above ultraviolet visible spectrophotometer "V-530 (produced by JASCO Corp.)", was 750.

(Colored Effluent 2)

A colored effluent, which was prepared so that the content of rhodamine dye "C.I. Basic Violet 10" was 40 ppm and the content of trisodium citrate was 400 ppm, was designated as "Colored Effluent 2". The degree of coloration, determined by the above ultraviolet visible spectrophotometer "V-530 (produced by JASCO Corp.)", was 1,800.

(Colored Effluent 3)

A colored effluent, which was prepared so that the content of styrene latex at a number average diameter of the primary particles of 125 nm was 1.0 part by weight in terms of solids and the content of sodium 1,2-diamonopropanetetraacetate was 200 ppm, was designated as "Colored Effluent 3". The degree of coloration, determined by the above ultraviolet visible spectrophotometer "V-530 (produced by JUSCO Corp.)", was 100.

Meanwhile, the above styrene latex was prepared via the following procedures.

Initially, 509.33 g of styrene monomers was prepared. The styrene monomers were heated to 80° C. and maintained at the above temperature. Subsequently, an aqueous surface active agent solution was prepared by dissolving 1.0 g of sodium dodecybenzenesulfonate in 2,200 g of pure water. The resulting solution was heated to 80° C. and maintained at the above temperature.

Subsequently, while stirring the above aqueous surface active agent solution, maintained at 80° C., the above styrene monomers were added, and the resulting mixture was emulsified via an ultrasonic homogenizer, whereby an emulsion was prepared in which the styrene monomers were emulsify-dispersed. Thereafter, the above emulsion was put into a four-necked flask fitted with a stirrer, a cooling pipe, a nitrogen introducing pipe, and a thermal sensor.

While stirring, an aqueous polymerization initiator solution, prepared by dissolving 7.52 g of ammonium persulfate in 500 g of pure water, was added under a flow of nitrogen while the temperature in the flask was maintained at 70° C., followed by polymerization reaction over four hours. After completing the reaction, the temperature in the flask was lowered to room temperature and filtration was carried out, whereby a latex composed of styrene resin particles was obtained. Meanwhile, it was confirmed that a stable styrene latex was formed since no residue was noted after the reaction.

The number average diameter of the primary particles of the formed styrene latex was determined employing electrophoretic light scattering photometer "ELS-800" (produced by OTSUKA Electronics Co., Ltd), resulting in 125 nm.

2. Decolorization of Colored Effluent

While slowly stirring "Colored Effluent 1", ferric chloride (iron(III) chloride) was added to result in 1,000 ppm. At the time, the pH of the colored effluent was 4.0 at 20° C.

Subsequently, the pH of the colored effluent was regulated to 1.5 by the addition of hydrochloric acid. The resulting solution was allowed to stand for 10 minutes to result in formation of coagulants of colored materials, followed by separation of the colored materials.

After being allowed to stand, part of the supernatant was sampled, and the degree of coloration of the sample was determined employing the above determination method, resulting in the degree of coloration of 10 and the sample solution was nearly colorless and transparent.

Example 2

While slowly stirring "Colored Effluent 1", ferric chloride (iron(III) chloride) was added to result in 1,700 ppm. At the time, the pH of the colored effluent was 3.9 at 20° C.

Subsequently, the pH of the colored effluent was regulated to 2.0 by the addition of hydrochloric acid. The resulting solution was allowed to stand for 10 minutes to result in formation of coagulants of colored materials, followed by separation of the colored materials.

After being allowed to stand, part of the supernatant was sampled, and the degree of coloration of the sample was determined employing the above determination method, resulting in the degree of coloration of 10, and the sample solution was nearly colorless and transparent.

Example 3

While slowly stirring "Colored Effluent 1", polychlorinated aluminum (PAC) was added to result in 1,500 ppm. At the time, the pH of the colored effluent was 7.0 at 20° C.

Subsequently, the pH of the colored effluent was regulated to 2.0 by the addition of hydrochloric acid. The resulting solution was allowed to stand for 10 minutes to result in formation of coagulants of colored materials, followed by separation of the colored materials.

After being allowed to stand, part of the supernatant was sampled, and the degree of coloration of the sample was determined employing the above determination method, resulting in the degree of coloration of 9, and the sample solution was nearly colorless and transparent.

Example 4

While slowly stirring "Colored Effluent 2", ferric chloride (iron(III) chloride) was added to result in 1,300 ppm. At the time, the pH of the colored effluent was 4.0 at 20° C.

Subsequently, the pH of the colored effluent was regulated to 2.0 by the addition of hydrochloric acid. The resulting solution was allowed to stand for 10 minutes to result in formation of coagulants of colored materials, followed by separation of the colored materials.

After being allowed to stand, part of the supernatant was sampled, and the degree of coloration the sample was determined employing the above determination method, resulting in the degree of coloration of 8, and the sample solution was nearly colorless and transparent.

Example 5

While slowly stirring "Colored Effluent 3", ferric chloride (iron(III) chloride) was added to result in 1,000 ppm. At the time, the pH of the colored effluent was 4.0 at 20° C.

Subsequently, the pH of the colored effluent was regulated to 2.0 by the addition of hydrochloric acid. The resulting solution was allowed to stand for 10 minutes to result in formation of coagulants of colored materials, followed by separation of the colored materials.

After being allowed to stand, part of the supernatant was sampled, and the degree of coloration of the sample was determined employing above ultraviolet visible spectrophotometer "V-530" (produced by JASCO Corp.), resulting in the degree of coloration of 8 and the solution was nearly colorless and transparent.

Example 6

While slowly stirring "Colored Effluent 1", its pH was regulated to 2.0 by the addition of hydrochloric acid. Thereafter, polychlorinated aluminum (PAC) was added to result in 1,000 ppm. At that time, the pH of the colored effluent was 2.0. The resulting solution was allowed to stand for 10 minutes to result in formation of coagulants of colored materials, followed by separation of the colored materials.

After being allowed to stand, part of the supernatant was sampled, and the degree of coloration of the sample was determined employing above ultraviolet visible spectrophotometer "V-530" (produced by JASCO Corp.), resulting in the degree of coloration of 10, and the sample solution was nearly colorless and transparent.

Comparative Example 1

While slowly stirring "Colored Effluent 1", ferric chloride was added to result in 1,000 ppm, and subsequently, the pH was regulated to 7.0 via sodium hydroxide, followed by being allowed to stand for 10 minutes.

After being allowed to stand, part of the supernatant was sampled, and the degree of coloration of the sample was determined employing above ultraviolet visible spectrophotometer "V-530" (produced by JASCO Corp.), resulting in the degree of coloration of 600, and the solution was pale brown.

Comparative Example 2

While slowly stirring "Colored Effluent 1", ferric chloride was added to result in 1,000 ppm, and subsequently, the pH was regulated to 10.0 via sodium hydroxide, followed by being allowed to stand for 10 minutes.

After being allowed to stand, part of the supernatant was sampled, and the degree of coloration of the sample was determined employing above ultraviolet visible spectrophotometer "V-530" (produced by JASCO Corp.), resulting in the degree of coloration of 1,000, and the solution was dense brownish red.

Comparative Example 3

While slowly stirring "Colored Effluent 2", polychlorinated aluminum chloride (PAC) was added to result in 1,000 ppm, and subsequently, the pH was regulated to 10.0 by the addition of sodium hydroxide, followed by being allowed to stand for 10 minutes.

After being allowed to stand, part of the supernatant was sampled, and the degree of coloration of the sample was determined employing above ultraviolet visible spectrophotometer "V-530" (produced by JASCO Corp.), resulting in the degree of coloration of 600, and the solution was milky-white.

Comparative Example 4

While slowly stirring "Colored Effluent 1", ferric chloride (iron chloride (III)) was added to result in 1,000 ppm, followed by being allowed to stand for 10 minutes.

After being allowed to stand, part of the supernatant was sampled, and the degree of coloration of the sample was determined employing above ultraviolet visible spectrophotometer "V-530" (produced by JASCO Corp.), resulting in the degree of coloration of 600 and the solution was milky-white.

Table 1 shows the colored effluent identity number, compounds incorporated in the colored effluent, inorganic metal salts and their added amount, compounds employed to regulate hydrogen ion exponent and the pH after regulation, the degree of coloration prior to and after decolorization of colored effluents, and decolorization effects.

Decolorization effects were evaluated as follows.

A: the degree of coloration was 10 or less (commercially viable)

B: the degree of coloration exceeded 10 (commercially unviable)

TABLE 1

| | Colored Effluent | | Inorganic Metal Salt | | Regulation of Hydrogen Ion Exponent | | Degree of Coloration | | |
|---|---|---|---|---|---|---|---|---|---|
| | | Colored Material | Type | Added Amount (ppm) | Compound Employed for Regulation | pH after Regulation | Before Treatment | After Treatment | Effect |
| | | | | | | Regulation | | | |
| Example 1 | Colored Effluent 1 | *1 | ferric chloride | 300 | hydrochloric acid | *5 | 2 | 750 | 10 | A |
| Example 2 | Colored Effluent 1 | *1 | ferric chloride | 1500 | hydrochloric acid | *5 | 1.5 | 750 | 6 | A |
| Example 3 | Colored Effluent 1 | *1 | ** | 1500 | hydrochloric acid | *5 | 2 | 750 | 9 | A |
| Example 4 | Colored Effluent 2 | *2 | ferric chloride | 1300 | hydrochloric acid | *5 | 2 | 1800 | 8 | A |
| Example 5 | Colored Effluent 3 | *3 | ferric chloride | 500 | hydrochloric acid | *5 | 2 | 100 | 8 | A |
| Example 6 | Colored Effluent 1 | *1 | ** | 1500 | hydrochloric acid | *4 | 2 | 750 | 10 | A |

TABLE 1-continued

| | Colored Effluent | | Inorganic Metal Salt | | Regulation of Hydrogen Ion Exponent | | | Degree of Coloration | | |
|---|---|---|---|---|---|---|---|---|---|---|
| | Colored Material | Type | Added Amount (ppm) | Compound Employed for Regulation | Regulation | pH after Regulation | Before Treatment | After Treatment | Effect |
| Comparative Example 1 | Colored Effluent 1 | *1 | ferric chloride | 1000 | sodium hydroxide | *4 | 7 | 750 | 600 | B |
| Comparative Example 2 | Colored Effluent 1 | *1 | ferric Chloride | 1000 | sodium hydroxide | *4 | 10 | 750 | 1000 | B |
| Comparative Example 3 | Colored Effluent 2 | *2 | ** | 1000 | sodium hydroxide | *4 | 10 | 1800 | 600 | B |
| Comparative Example 4 | Colored Effluent 1 | *1 | ferric chloride | — | — | — | — | 750 | 900 | B |

*1: cyan pigment (20 ppm) + trisodium citrate (500 ppm)
*2: rhodamine dye (40 ppm) + trisodium citrate (400 ppm)
*3: latex (1 part by weight) + sodium 1,2-diaminopropaneteraacetate (200 ppm)
*4: after addition of inorganic metal salt
*5: before addition of inorganic metal salt,
** polychlorinated aluminum Based on the results in Table 1, it was confirmed that Examples 1-6 exhibited desired results of the degree of coloration after the treatment of at most 10, whereby the effects of the present invention were realized. On the other hand, it was confirmed that Comparative Examples 1-4 exhibited no desired effects of the degree of coloration after the treatment of at least 10, whereby the effects of the present invention were not realized.

What is claimed is:

1. A method of decolorizing a colored aqueous effluent comprising (i) a colored substance; and (ii) a polyvalent carboxylic acid or a polyvalent aminocarboxylic acid chelating agent containing two or more carboxylic acid groups,
    the method comprising the steps of:
    (a) controlling a hydrogen ion exponent (pH) of the colored effluent to be in a range in which said two or more carboxylic acid groups in the polyvalent carboxylic acid or the polyvalent aminocarboxylic acid do not dissociate;
    (b) adding an inorganic metal salt to the colored effluent so as to allow the inorganic metal salt to react with the colored substance to form a precipitation including coagulants in the colored effluent, wherein said range and said coagulants result in a structure which tends not to re-dissolve the colored substance in the aqueous effluent, and
    (c) eliminating the precipitation from the colored effluent.

2. The method of decoloring a colored effluent of claim 1, wherein the controlled hydrogen ion exponent (pH) is less than or equal to 2.0.

3. The method of decolorizing a colored effluent of claim 1, wherein the controlling the hydrogen ion exponent (pH) of the colored effluent is carried out by adding hydrochloric acid, sulfuric acid or sodium hydroxide to the colored effluent.

4. The method of decolorizing a colored effluent of claim 1, wherein an amount of the inorganic metal salt added to the colored effluent is in the range of 100-2,000 ppm based on the total weight of the colored effluent.

5. The method of decolorizing a colored effluent of claim 1, wherein an amount of the inorganic metal salt added to the colored effluent is in the range of 150-1,500 ppm based on the total weight of the colored effluent.

6. The method of decolorizing a colored effluent of claim 1, wherein the inorganic metal salt is one selected from the group consisting of aluminum sulfate, poly aluminum chloride(PAC), aluminum chloride, iron(III) chloride, poly iron(III) sulfate and iron (II) sulfate.

7. The method of decolorizing a colored effluent of claim 1, wherein the colored effluent has a temperature from 10-35° C.

8. The method of decolorizing a colored effluent of claim 1, wherein the polyvalent carboxylic acid is selected from the group consisting of oxalic acid, malonic acid, succinic acid, glutaric acid, adipic acid, pimelic acid, azelaic acid, sebacic acid, maleic acid, fumaric acid, itaconic acid, citraconic acid, mesaconic acid, gluconic acid, muconic acid, lactic acid, hydroacrylic acid, salicylic acid, vanillic acid, mandelic acid, malic acid, glyceric acid, tartaric acid, citric acid, isocitric acid, trimellitic acid, trimesic acid, aconitic acid, tricarballylic acid, ethanetricarboxylic acid and hexatricarboxylic acid.

* * * * *